US009141377B2

(12) United States Patent
Chancey et al.

(10) Patent No.: US 9,141,377 B2
(45) Date of Patent: Sep. 22, 2015

(54) VISUALIZATION OF CODE UNITS ACROSS DISPARATE SYSTEMS

(75) Inventors: Raphael P. Chancey, Leander, TX (US); Lei Chen, Beijing (CN); Eduardo T. Kahan, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 2005 days.

(21) Appl. No.: 12/033,079

(22) Filed: Feb. 19, 2008

(65) Prior Publication Data

US 2009/0210384 A1    Aug. 20, 2009

(51) Int. Cl.
*G06F 17/30*    (2006.01)
*G06F 9/44*    (2006.01)

(52) U.S. Cl.
CPC ....................................... *G06F 8/70* (2013.01)

(58) Field of Classification Search
CPC .................. G06F 17/30073; G06F 17/303221
USPC ................. 707/706, 722, 802, 778, 829, 956; 717/114
See application file for complete search history.

(56) References Cited

U.S. PATENT DOCUMENTS

| 5,175,856 | A  | * | 12/1992 | Van Dyke et al. | 717/151 |
|---|---|---|---|---|---|
| 5,375,242 | A  | * | 12/1994 | Kumar et al. | 717/147 |
| 6,836,883 | B1 | * | 12/2004 | Abrams et al. | 717/140 |
| 6,904,588 | B2 | * | 6/2005 | Reddy et al. | 717/104 |
| 7,007,029 | B1 |   | 2/2006 | Chen | |
| 7,152,223 | B1 | * | 12/2006 | Brumme et al. | 717/116 |
| 7,165,239 | B2 | * | 1/2007 | Hejlsberg et al. | 717/114 |
| 7,194,726 | B2 |   | 3/2007 | Allen et al. | |
| 7,581,231 | B2 | * | 8/2009 | Smith et al. | 719/328 |
| 2002/0029221 | A1 | * | 3/2002 | Lokken | 707/707 |
| 2004/0015834 | A1 | * | 1/2004 | Mestre et al. | 717/106 |
| 2004/0040011 | A1 | * | 2/2004 | Bosworth et al. | 717/114 |
| 2004/0143823 | A1 | * | 7/2004 | Wei | 717/140 |
| 2004/0230948 | A1 | * | 11/2004 | Talwar et al. | 717/114 |
| 2004/0268301 | A1 | * | 12/2004 | Kaston | 717/108 |
| 2005/0039165 | A1 | * | 2/2005 | Wolff et al. | 717/114 |
| 2005/0071805 | A1 | * | 3/2005 | Lauterbach et al. | 717/104 |
| 2005/0144137 | A1 | * | 6/2005 | Kumar et al. | 705/55 |
| 2005/0240902 | A1 | * | 10/2005 | Bunker et al. | 717/114 |
| 2006/0064677 | A1 | * | 3/2006 | Bickson et al. | 717/124 |
| 2006/0070028 | A1 | * | 3/2006 | Belov et al. | 717/114 |
| 2006/0136918 | A1 |   | 6/2006 | Lewis et al. | |
| 2007/0044066 | A1 | * | 2/2007 | Meijer et al. | 717/100 |
| 2008/0098405 | A1 | * | 4/2008 | Kumar et al. | 719/313 |
| 2009/0150906 | A1 | * | 6/2009 | Schmidt et al. | 719/317 |

OTHER PUBLICATIONS

Healey, S. T., et al., "Decomposition of Logic Networks Into Silicon", *22nd ACM/IEEE Design Automation Conference Proceedings 1985* (Cat. No. 85CH2142-8), (Jun. 1985),pp. 162-168.

Songlin, H. et al., "Customization Oriented Template Technology for Engineering CAD System", : *Journal of Computer Aided Design & Computer Graphics*, vol. 14 No. 4,(Apr. 2002),pp. 369-374.

* cited by examiner

*Primary Examiner* — Robert Beausoliel, Jr.
*Assistant Examiner* — Alexandria Bromell
(74) *Attorney, Agent, or Firm* — DeLizio Law, PLLC

(57) ABSTRACT

A visualization tool that provides visibility of the functionality implemented with each system used by an institution(s) at code unit granularity can be used to overcome a variety of challenges that can occur in an environment with disparate systems. The visualization tool discovers and graphically displays functions/procedures/methods ("code units") that satisfy a set of one or more criteria, as well as attributes of the discovered code units. Furthermore, the visualization tool can automatically provide visual annotations to identify targets for asset maintenance, targets to leverage for other systems, etc.

12 Claims, 5 Drawing Sheets

100,01,00,002001012101100,00,00000000000000000# VISUALIZATION OF CODE UNITS ACROSS DISPARATE SYSTEMS

BACKGROUND

Embodiments of the inventive subject matter generally relate to the field of computers, and, more particularly, to visualization of code units across disparate systems. A number of companies use a mixture of systems that may include a COBOL system, a PL/I system, a C language system, and Java® language system.

BRIEF SUMMARY

According to one embodiment of the inventive subject matter, a method comprises searching across a plurality of disparate systems to find a plurality of code units that satisfy one or more search criteria. The plurality of disparate systems comprises code of different programming languages. Data about each of the plurality of code units is recorded. The data about each of the plurality of code units comprises a code unit identifier, indication of a programming language, and one or more attributes. A graphical representation of the plurality of code units is generated. The graphical representation comprises graphic elements that correspond to respective ones of the plurality of code units. The graphical representation is generated with control points associated with the graphic elements. A first of the control points, when activated, graphically decomposes a first of the graphic elements to reveal one or more attributes of a first of the plurality of code units represented by the first graphic element.

BRIEF DESCRIPTION OF THE SEVERAL VIEWS OF THE DRAWINGS

The present embodiments may be better understood, and numerous objects, features, and advantages made apparent to those skilled in the art by referencing the accompanying drawings.

DETAILED DESCRIPTION

The description that follows includes exemplary systems, methods, techniques, instruction sequences and computer program products that embody techniques of the present inventive subject matter. However, it is understood that the described embodiments may be practiced without these specific details. For instance, although examples refer to term based discover technique, embodiments can base discovery of code units on data types, code unit size, type of output, etc. In other instances, well-known instruction instances, protocols, structures and techniques have not been shown in detail in order not to obfuscate the description.

The description uses the terms "asset" and "system." The term "asset" is used to refer to code. An example of an asset would be the COBOL code on one or more machines of an organization. The asset can be machine code, object code, source code, annotated code, etc. An asset can range from a single file to several files, including library files. Regardless of the number of files, an asset includes any number of functions or procedures ("code units" or "units of code"). In addition, assets of an organization can include code developed at different times by different developers. The term "system" is used to refer to a collection of one or more hardware components and the asset(s) associated with the one or more hardware components. The one or more hardware components can encode the asset(s), execute the asset(s), render output from an executing instance(s) of the asset(s), handle input for an executing instance(s) of the asset(s), etc.

A visualization tool that provides visibility of the functionality implemented with each system used by an institution(s) at code unit granularity can be used to overcome a variety of challenges that can occur in an environment with disparate systems. The visualization tool would allow efficient maintenance of systems, update of systems, modification of systems, collaboration between systems of different institutions, etc. A user can use the visualization tool to discover and graphically display functions/procedures/methods ("code units") that satisfy a set of one or more criteria, as well as attributes of the discovered code units. The user can then efficiently perform various tasks. Examples of the various tasks include eliminating redundant code units across the disparate systems, adding systems that leverage existing functionality to deliver new services, etc. For instance, a bank may be developing Java code to provide online services to customers. The bank maintains account data with COBOL systems. The bank can use the visualization tool to discover and leverage existing functionality in the COBOL systems for access by the Java code to provide the online services. Furthermore, the visualization tool can automatically provide visual annotations to identify targets for asset maintenance, targets to leverage for other systems, etc.

Figure 1:
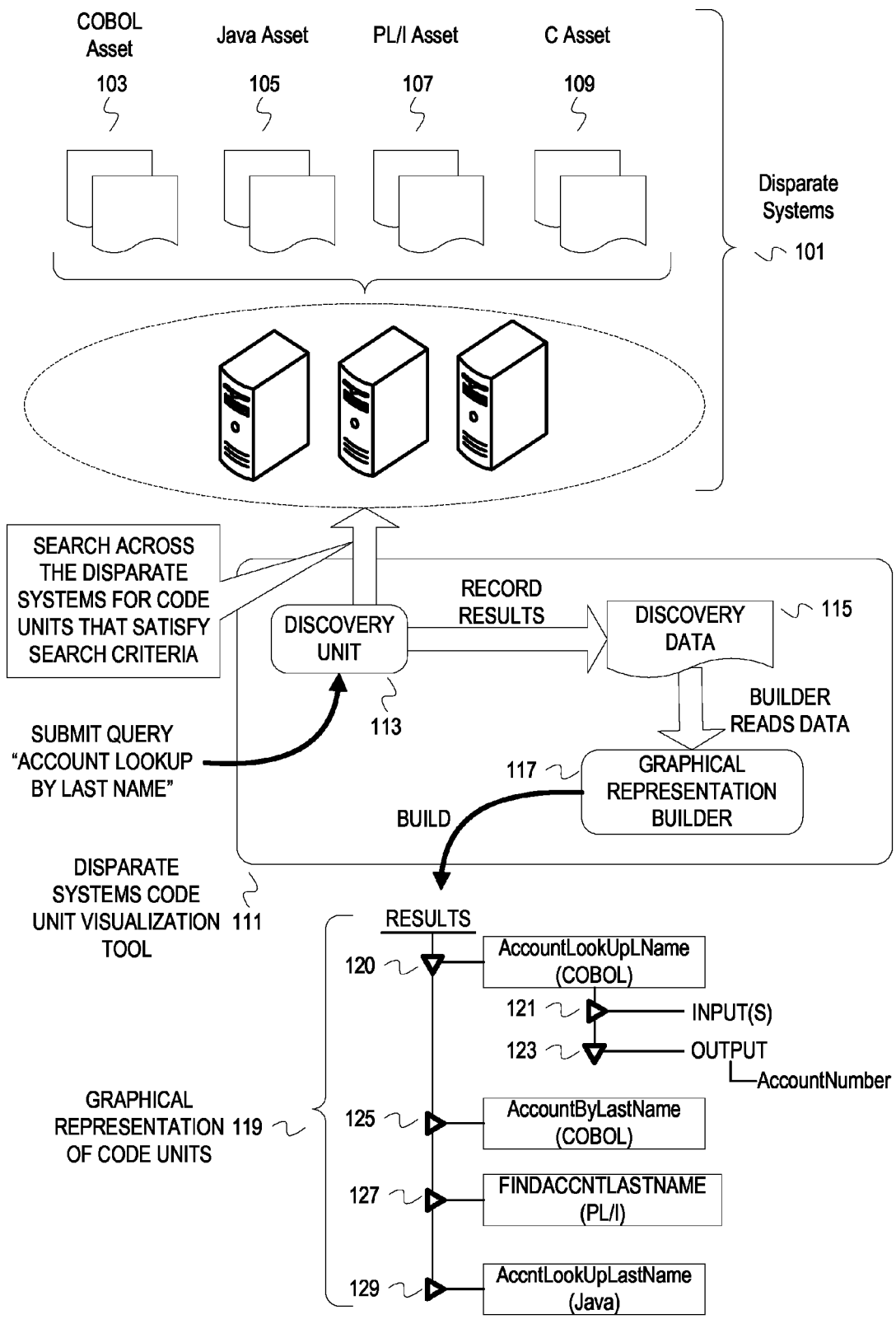
FIG. 1 depicts a conceptual example of discovering code units and generating a graphical representation of the code units.

FIG. 1 depicts a conceptual example of discovering code units and generating a graphical representation of the code units. Disparate systems 101 include hardware and a variety of assets. The disparate systems 101 include a COBOL asset 103, a Java asset 105, a PL/I asset 107, and a C asset 109. A disparate systems code unit visualization tool 111 accesses the disparate systems 101 to discover code units that satisfy search criteria submitted to the disparate system code unit visualization tool 111. The disparate system code unit visualization tool 111 comprises a discovery unit 113 and a graphical representation builder 117.

In FIG. 1, the disparate system code unit visualization tool 111 receives a query "ACCOUNT LOOKUP BY LAST NAME." at the discovery unit 113. The discovery unit 113 searches across the disparate systems 101 for one or more code units in the assets 101, 103, 105, 107, and 109 that satisfy the submitted search query. Embodiments can use different techniques to implement the search functionality. An embodiment can search the asset for strings that match the submitted query to different degrees (e.g., completely match, partially match, contain at least one term, etc.). Another embodiment can utilize one or more heuristics for the search to find code units that satisfy the submitted query. For instance, the discovery unit 113 can use the one or more heuristics to discover code units that have abbreviated versions of one or more of the search terms. Embodiments can use standard programming semantics to distinguish input variables, output variables, code unit names, etc. Embodiment can also pre-process the assets to assist in the discovery process. For example, tagged versions of the assets may be created with metadata or symbols that identify code unit names and attributes of the code units (e.g., code unit input, code unit output, data types, etc.) ("code unit elements"). As another example, code unit elements may be extracted from the assets, then delimited and/or tagged. Although FIG. 1 depicts the discovery unit 111 performing the discovery, the discovery unit 111 can invoke processes or daemons tailored to search particular ones of the assets (e.g., a COBOL asset search process, a PL/I asset search process, etc.). In addition, the discovery unit 113 can apply a reverse compiler to an asset that includes machine code.

During or after the discovery process, the discovery unit 113 records the results of the discovery process or search as discovery data 115. The depiction of the discovery data 115 within the disparate systems code unit visualization tool 111 is not intended to convey that the discovery data is recorded within the space of the tool 111, although it could be recorded to memory space owned by the instance of the tool 111. The discovery unit 113 can write the discovery results into a single file, multiple files, etc. The discovery unit 113 can record the results in accordance with different techniques to communicate the different elements of the discovered code units that satisfy the search criteria. Examples of the different techniques include tagging the results with metadata, recording the results with delimiters, recording the results with a particular structure, etc.

The graphical representation builder 117 reads the discovery data 115, and builds a structure with the discovery data 115. The graphical representation builder 117 builds a structure that associates graphical elements with the code units elements indicated in the discovery data 115. The disparate systems code unit visualization tool 111 then supplies the structure built by the graphical representation builder 117 for display.

A graphical representation 119 of the structure supplied by the disparate systems code unit visualization tool 111 is depicted as a tree representation in FIG. 1. In FIG. 1, the graphical representation 119 includes a root graphic element that displays "RESULTS." Beneath the root graphic element, the graphical representation 119 includes graphic elements that represent four code unit discovered as satisfying the search criteria. The graphic elements display the following code unit names: "AccountLookupLname," "AccountByLastName," "FINDACCNTLASTNAME," and "AccntLookUpLastName." Each of the code unit name graphic elements also display the relevant asset. The AccountLookupLname graphic element and the AccountByLastName graphic element indicate "(COBOL)." The FINDACCNTLASTNAME graphic element indicates "(PL/I)." The AccntLookUpLastName graphic element indicates "(Java)." The data that identifies the asset-in this example programming language of the relevant asset—can be hidden, stored as an attribute of the code unit, stored as a property of the graphic element, etc.

Each of the graphic elements that display the code unit names are associated with graphic elements that respond to activation ("control points") to graphically decompose the code unit name graphic elements. Control points 120, 125, 127, and 129 are respectively associated with the AccountLookupLname graphic element, the AccountByLastName graphic element, the FINDACCNTLASTNAME graphic element, and the AccntLookUpLastName graphic element. The control points 125, 127, and 129 are depicted as pointing to the right to convey that the control points are not activated. The control point 120 is illustrated as pointing down to convey that the control point 120 has been activated to graphically decompose the AccountLookupLname graphic element. Activation of the control point 120 decomposes the AccountLookupLname graphic element to reveal graphical representation of two attributes of the code unit AccountLookupLname. The decomposition reveals input and output attributes of the code unit with an "INPUT(S)" graphic element and an "OUTPUT(S)" graphic element.

Each of the attribute graphic elements are also associated with control points. The "INPUT(S)" graphic element is associated with a control point 121, which is not activated. The "OUTPUT(S)" graphic element is associated with a control point 123, which is activated. Activation of the control point 123 graphical decomposes the "OUTPUT(S)" graphic element to reveal a code unit element, which is the output variable "AccountNumber." The code unit element "AccountNumber" is graphically represented with a graphic element that displays 'AccountNumber" beneath the "OUTPUT(S)" graphic element.

With the example depicted in FIG. 1, a user could eliminate the PL/I code unit and the "AccountByLastName" code unit as redundant elements. The visualization tool 111 can record references (e.g., pointers) to the code units and/or calls to the code units, and provide an option or command to eliminate code units. In response to selection of the command or option, the visualization tool 111 can perform various operations to carry out elimination of the code units and/or calls to the code units. Examples of operations include commenting out the code units and/or calls to the code units, deleting the calls to the code units, generating a request to cull the code units, etc. In another embodiments, the visualization tool 111 accesses the assets and displays the codes units selected for elimination to allow the user to make edits to the assets.

A user can also use the visualization tool 111 to leverage existing systems. The user could decide to call the AccountLookUpLName code unit from another asset. The user activates the control point 121 to reveal the input parameters of the code unit to properly pass values/parameters and invoke the code unit.

The example in FIG. 1 assumes that the discovery unit applies a filter to the assets based on one or more search terms, but a filter can be created based on predefined options, user specific configurations, etc. Embodiments can present a user with a menu of options for selection instead of or in addition to the user entering terms. For example, a user can select to search on one or more code unit elements (e.g., code unit name, input, output, etc.). The user can then add one or more search terms to apply to the selected code unit element.

Figure 2:
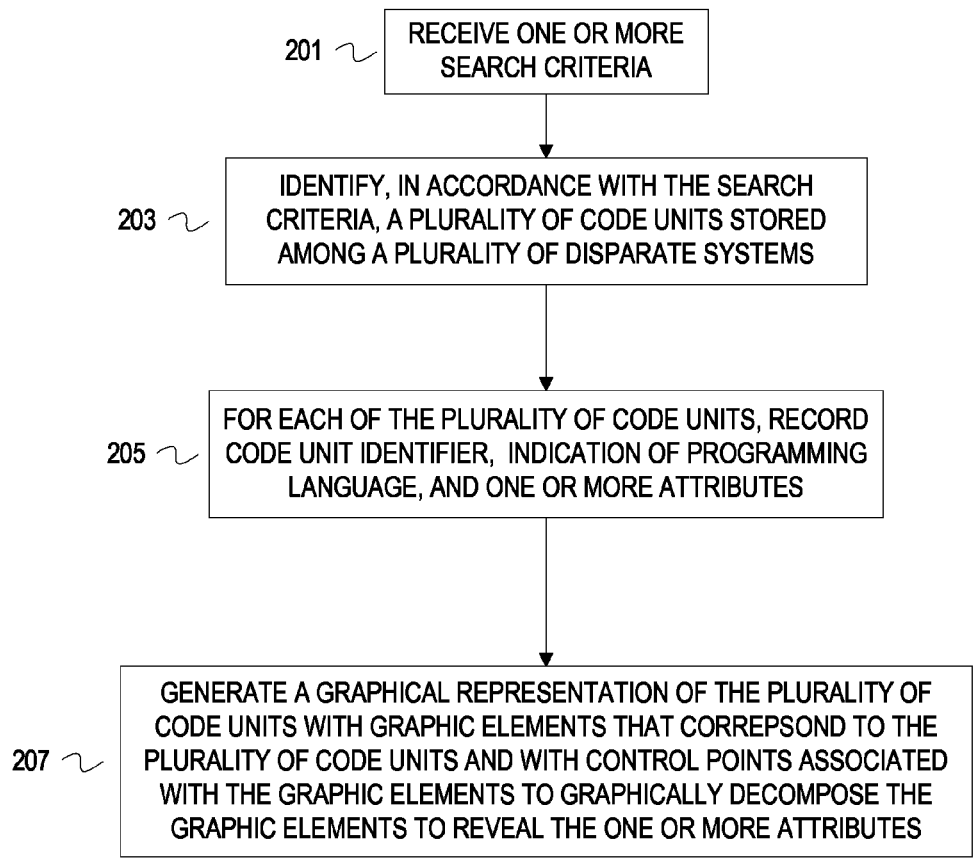
FIG. 2 depicts a flowchart of example operations for generating a graphical representation of code units across disparate systems that satisfy one or more search criteria.

FIG. 2 depicts a flowchart of example operations for generating a graphical representation of code units across disparate systems that satisfy one or more search criteria. At block 201, one or more search criteria are received. At block 203, a plurality of code units stored among a plurality of disparate systems is identified in accordance with the search criteria. Embodiments can set various thresholds for the satisfaction of the one or more search criteria to perform discovery. For instance, an embodiment can disregard articles and discover a code unit that only satisfies 60% of the non-article terms, assuming a term based discovery operation. As stated above, embodiments are not limited to term based discovery. For example, embodiments can search for code units that use encryption functionality.

At block 205, a code unit identifier, an indication of programming language, and one or more attributes (e.g., input variables, output variables, internally referenced code units, code unit size, etc.) are recorded for each of the discovered plurality of code units.

At block 207, a graphical representation of the discovered plurality of code units is generated. The graphical representation comprises graphic elements (e.g., folder icons, basic shapes, etc.) that represent elements of the plurality of code units. The graphical representation comprises graphic elements that represent the code units ("code unit graphic elements") and graphic elements that represent each of the attributes of the code units ("attribute graphic elements"). The indication of programming language can also be associated with a graphic element, which can be displayed with various techniques. Examples of display techniques include displaying a programming language indication graphic element in response to a variety of requests (e.g., selection of an option in a menu, selecting a button, etc.), defining a property of the code unit graphic elements with the programming language indication (e.g., defining different colors to represent different programming languages, etc.). Embodiments can also display text to convey the indication of programming language. The graphic elements are associated with the control points to hierarchically decompose the graphical representation. A control point graphically decomposes a graphic element to reveal child graphic elements in response to activation of the control point.

To generate the graphical representation, embodiments can consume the recorded data for discovered code unit in accordance with different techniques. Examples of the different techniques include a single process serially searching assets and writing to a single file, multiple processor or sub-processes searching assets in parallel and writing to individual files or a shared file, writing references to relevant portions of the assets, etc.

Figure 3:
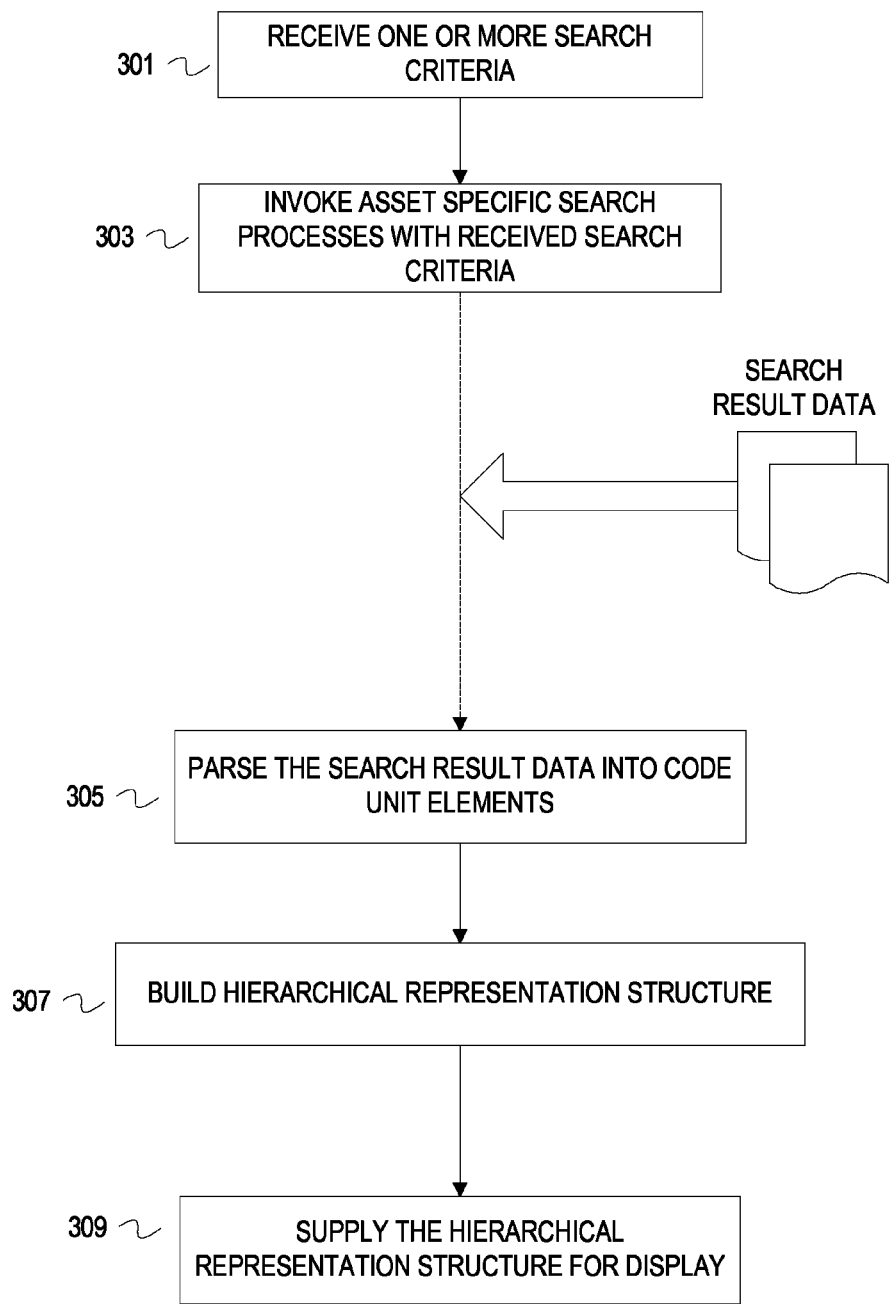
FIG. 3 depicts a flowchart of example operations for discovering code units and consuming search result data from multiple search processes.

FIG. 3 depicts a flowchart of example operations for discovering code units and consuming search result data from multiple search processes. At block 301, one or more search criteria are received. At block 303, asset specific search processes are invoked or launched with the received search criteria. After the search result data is received from the asset specific search processes, the search result data is parsed into code unit elements (i.e., code unit identifier and one or more attributes) and associated with graphic elements. A discovery unit or module reads the search result data and parses the search result data based on occurrence of delimiters. For example, the discovery unit can read the search result data with an understanding that code unit elements will be provided in a given order. Further, particular delimiters can be used to distinguish different types of code elements, different code units, and multiple occurrences of a given type of code unit element (e.g., multiple input variables). As another example, the search result data can be tagged with metadata to distinguish the different code unit elements and multiple occurrences of a code unit element. Embodiment can also task the asset specific search processes with creation of hierarchical structures to represent the results, and task the discovery unit with aggregating the different structures provided by the asset specific search processes.

At block 307, a hierarchical representation structure is built with the parsed code unit elements. As stated above, asset specific hierarchical structures may have already been built. Operations can then be performed to aggregate the multiple structures into a single structure. At block 309, the hierarchical representation structure is supplied for display.

Embodiments can employ different techniques to parse discovery data. Embodiment can search raw assets and/or search prepared assets (e.g., tagged assets or tagged copies of assets). An embodiment can crawl over all assets or copies of assets and tag the assets with metadata to indicate code unit elements. An embodiment can crawl over assets and catalog code units and code unit elements. An embodiment can incrementally catalog code units. For example, each time a discovery is performed, the recorded data is stored to gradually build a database of code unit elements for visualization of code units across disparate systems.

Figure 4:
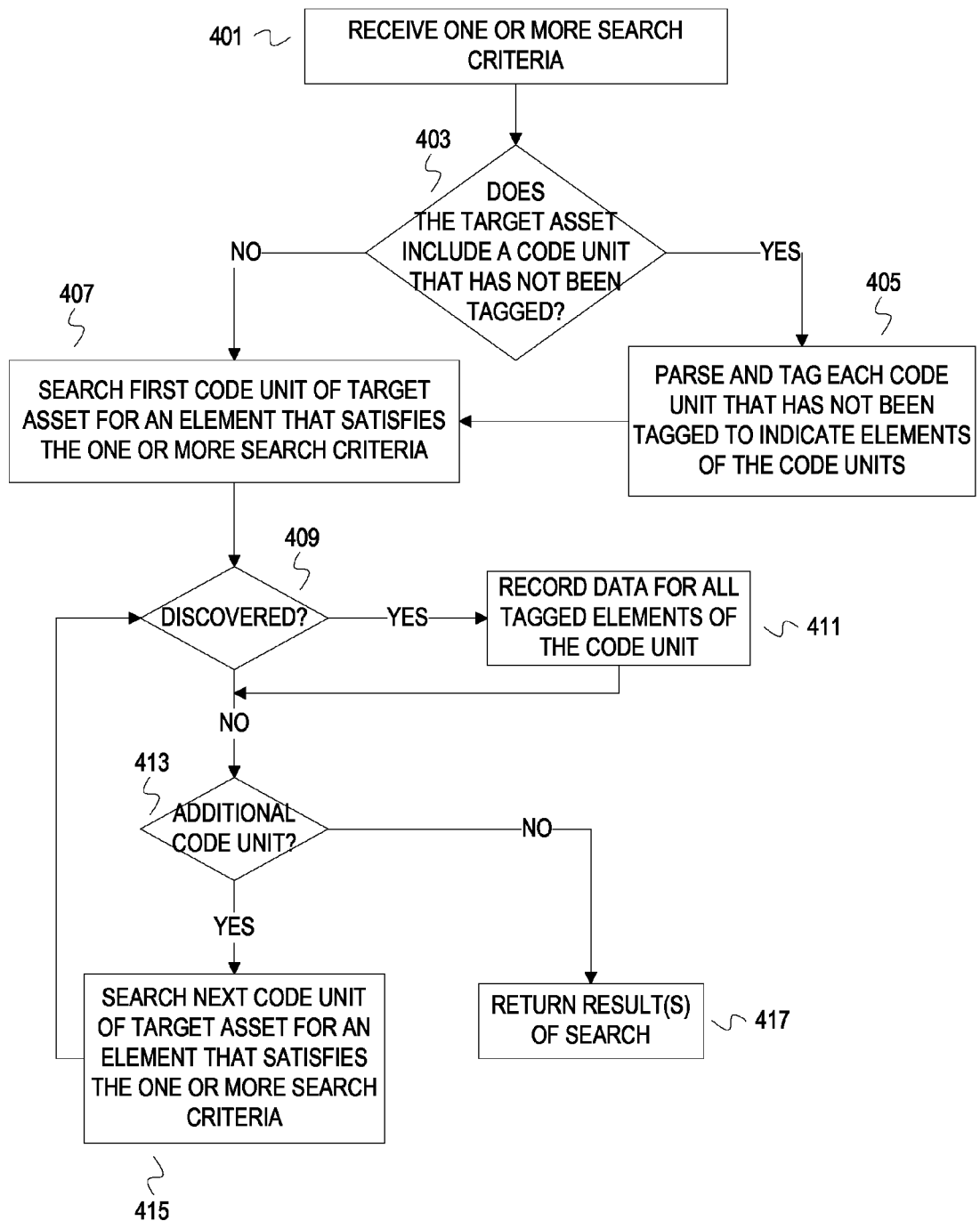
FIG. 4 depicts a flowchart of example operations for tagging code units and parsing discovered code unit data.

FIG. 4 depicts a flowchart of example operations for tagging code units and parsing discovered code unit data. At block 401, one or more search criteria are received. At block 403, it is determined if the target asset includes a code unit that has not been tagged. If the target asset includes a code unit that has not been tagged, then control flows to block 405. If the target asset does not include a code unit that has not been tagged, then control flows to block 407.

At block 405, each code unit that has not been tagged is parsed and tagged to indicate elements of the code unit. Control flows from block 405 to block 407.

At block 407, the first code unit of the target asset is searched for an element that satisfies some or all of the one or more search criteria. At block 409, it is determined if an element of the searched code unit was discovered. If an element was discovered, then control flows to block 411. If an element was not discovered, then control flows to block 413.

At block 411, data for all elements of the code unit indicated with tags. Of course, it is not necessary for embodiments to record data for all elements indicated with tags. A tool can record data for only some of the elements of the code unit. For example, a tool can be configured to record all data in one discovery and only code unit name and I/O variable for a different discovery. Control flows from block 411 to block 413.

At block 413, it is determined if the asset comprises additional code units. If so, then control flows to block 415. If not, then control flows to block 417.

At block 413, a next code unit of the target asset is searched for an element that satisfies some or all of the received search criteria. Control flows from block 415 back to block 409.

If it was determined there were no additional code units at block 413, then the result(s) of the search are returned at block 417.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, additional operations can be performed to map the element of the hierarchical representation structure to graphic elements. For example, elements can be associated with different icons based on level within the hierarchical structure. In another embodiment, operations are performed to map each of the elements of the hierarchical structure to graphic elements prior to being supplied for display. Referring to FIG. 2, operations to record data and build the graphical representation can be performed concurrently. As data is recorded, the graphical representation or the hierarchical representation structure can be built. As another example, operations to build the graphical representation or hierarchical structure can include recording data (e.g., the data is recorded into the hierarchical structure).

Embodiments of the inventive subject matter may be provided as a computer program product, or software, that may include a machine-readable medium having stored thereon instructions (e.g., firmware, resident software, micro-code, etc.), which may be used to program a computer system (or other electronic device(s)) to perform a process(es) according to embodiments, whether presently described or not since every conceivable variation is not enumerated herein. A machine readable medium includes any mechanism or article of manufacture for storing ("machine-readable storage medium") or transmitting ("machine-readable signal medium") information in a form (e.g., software, processing application) readable by a machine (e.g., a computer, a mobile phone, etc.). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing executable instructions. In addition, embodiments may be embodied in a machine-readable signal medium, examples of which can include an electrical, optical, acoustical or other form of propagated signal (e.g., carrier waves, infrared signals, digital signals, etc.), or wireline, wireless, or other communications medium.

Computer program code for carrying out operations of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the above flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present inventive subject matter. In this regard, each block in the flowchart or block diagrams may represent a module, segment, or portion of code, which comprises one or more executable instructions for implementing the specified logical function(s).

Figure 5:
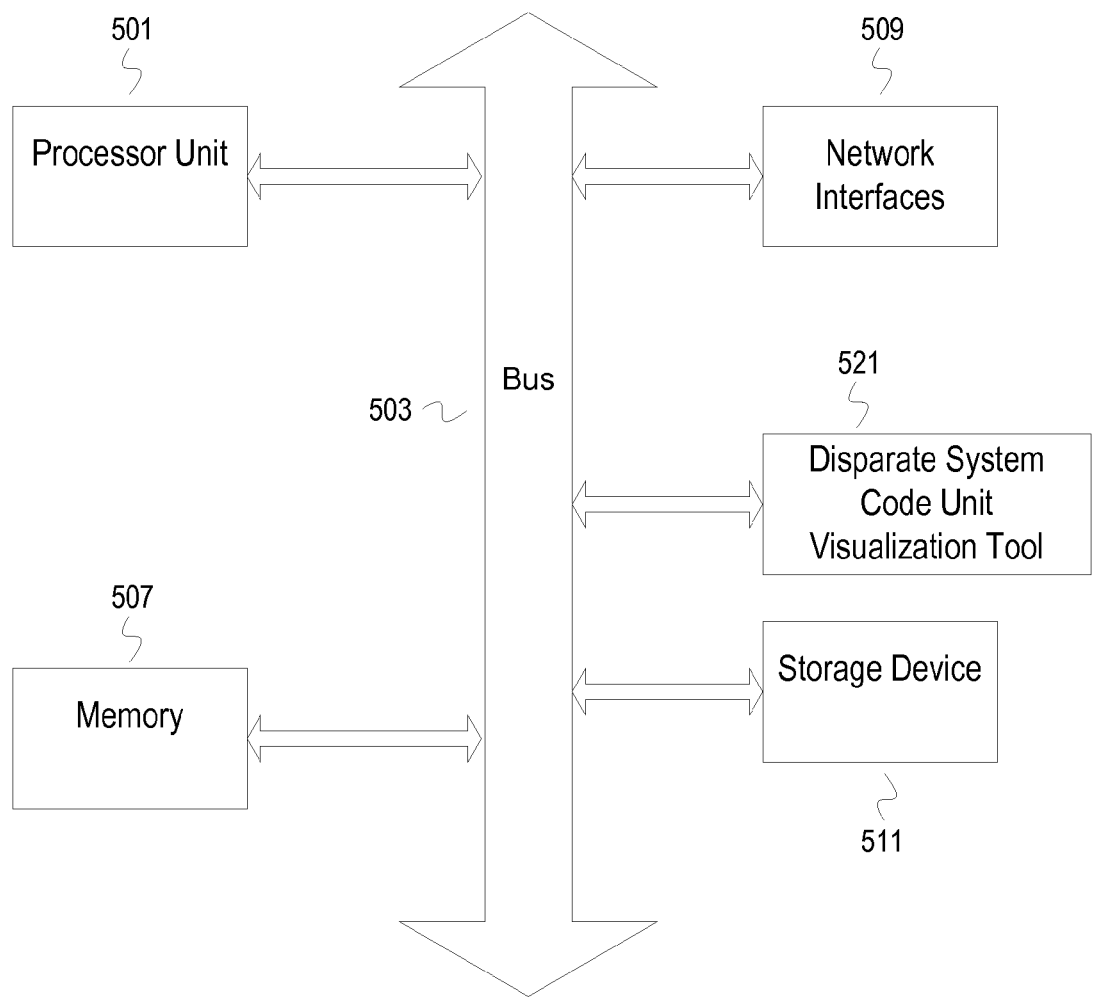
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) and/or any one or more of the above already described possible realizations of machine-readable media. The computer system also includes a bus 503 (e.g., PCI, ISA, PCI-Express, HyperTransport®, InfiniBand®, NuBus, etc.), a network interface 509 (e.g., an ATM interface, an Ethernet interface, a Frame Relay interface, SONET interface, wireless interface, etc.), and a storage device(s) 511 (e.g., optical storage, magnetic storage, etc.). The computer system also includes a disparate system code unit visualization tool 521 that performs the functionalities for discovering code units across disparate systems and causing visualization of the discovered code units. Some or all of the functionality performed by the tool 521 can be implemented with an application specific integrated circuit, in logic implemented in the processing unit 501, in a co-processor on a peripheral device or card, etc. Moreover, some or all of the functionality performed by the tool 521 can be embodied in code stored on one or more of the memory 507, the processor unit 501, a co-processor, and the storage device 511. Further, realizations may include fewer or additional components not illustrated in FIG. 5 (e.g., video cards, audio cards, additional network interfaces, peripheral devices, etc.). The processor unit 501, the storage device(s) 511, the disparate system code unit visualization tool 521, and the network interface 509 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for visualizing code units of disparate systems as described herein may be implemented with facilities consistent with any hardware system or hardware systems. Many variations, modifications, additions, and improvements are possible.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method comprising:
   searching across a plurality of disparate systems to find a plurality of code units that satisfy one or more search criteria, wherein the plurality of disparate systems comprise code of different programming languages;
   recording data about each of the plurality of code units, wherein the data about each of the plurality of code units comprises a code unit identifier, indication of a programming language, indication of input to the code unit, and indication of output from the code unit, for each of the plurality of code units;
   building a hierarchical representation with the data, the hierarchical representation encoding for each of the plurality of code units the indication of the programming language with the code unit identifier and encoding hierarchical relationships between the code unit identifier, the indication of the input to the code unit, and the indication of output to the code unit for each of the plurality of code units; and supplying the hierarchical representation for visualization of the plurality of code units.

2. The method of claim 1, wherein the data about each of the plurality of code units also comprises, size of a code unit, and code unit references within the code unit.

3. The method of claim 1, wherein the plurality of disparate systems comprises systems of different programming languages.

4. The method of claim 1 further comprising:
generating a graphical representation of the hierarchical representation,
wherein the graphical representation comprises a first graphic element that presents the code unit identifier of a first of the plurality of code units, a second graphic element that graphically decomposes the first graphic element to reveal a third graphic element that presents the indication of input to the first code unit,
wherein the second graphic element decomposes the first graphic element in response to activation.

5. One or more non-transitory machine-readable storage media for code unit visualization having stored therein a program product, which when executed by a set of one or more processor units causes the set of one or more processor units to perform operations that comprise:
searching across a plurality of disparate systems to find a plurality of code units that satisfy one or more search criteria, wherein the plurality of disparate systems comprise code of different programming languages;
recording data about each of the plurality of code units, wherein the data about each of the plurality of code units comprises a code unit identifier, indication of a programming language, indication of output from the code unit, and indication of input to the code unit, for each of the plurality of code units;
building a hierarchical representation with the data, the hierarchical representation encoding for each of the plurality of code units the indication of the programming language with the code unit identifier and encoding hierarchical relationships between the code unit identifier, the indication of the input to the code unit, and the indication of output to the code unit for each of the plurality of code units; and
supplying the hierarchical representation for visualization of the plurality of code units.

6. The non-transitory machine-readable storage media of claim 5, wherein the data about each of the plurality of code units also comprises, size of a code unit, and code unit references within the code unit.

7. The non-transitory machine-readable storage media of claim 5, wherein the plurality of disparate systems comprises systems of different programming languages.

8. The non-transitory machine-readable storage media of claim 5, wherein the operations further comprise:
generating a graphical representation of the hierarchical representation,
wherein the graphical representation comprises a first graphic element that presents the code unit identifier of a first of the plurality of code units, a second graphic element that graphically decomposes the first graphic element to reveal a third graphic element that presents the indication of input to the first code unit,
wherein the second graphic element decomposes the first graphic element in response to activation.

9. An apparatus comprising:
a set of one or more processor units;
one or more network interfaces; and
a disparate systems code unit visualization tool, the disparate systems code unit visualization tool operable to,
search across a plurality of disparate systems via the one or more network interfaces to find a plurality of code units that satisfy one or more search criteria, wherein the plurality of disparate systems comprise code of different programming languages;
record data about each of the plurality of code units, wherein the data about each of the plurality of code units comprises a code unit identifier, indication of a programming language, and indication of output from the code unit, and indication of input to the code unit, for each of the plurality of code units;
build a hierarchical representation with the data, the hierarchical representation encoding for each of the plurality of code units the indication of the programming language with the code unit identifier and encoding hierarchical relationships between the code unit identifier, the indication of the input to the code unit, and the indication of output to the code unit for each of the plurality of code units; and
supply the hierarchical representation for visualization of the plurality of code units.

10. The apparatus of claim 9 further comprising an input component to receive the one or more search criteria.

11. The apparatus of claim 9 further comprising one or more machine-readable media having encoded therein the disparate systems code unit visualization tool executable by the set of one or more processor units.

12. The apparatus of claim 9 further comprising a display component, wherein the disparate systems code unit visualization tool is operable to supply the hierarchical representation to the display component.

* * * * *